Patented Sept. 3, 1929.

1,727,135

UNITED STATES PATENT OFFICE.

HERMANN SCHÜTTE, OF MANNHEIM, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY.

TANNING AGENT.

No Drawing. Application filed June 29, 1927, Serial No. 202,461, and in Germany September 6, 1926.

I have found that the water-soluble reaction products obtainable by condensing phenol, or its homologues or derivatives, with formaldehyde and salts of sulfurous acid, may be converted into valuable tanning agents by condensing them with sulfur in the presence of agents having an alkaline reaction.

This may be effected for example by employing, for the condensation of the primary reaction products with sulfur, the alkali liberated by the combination of neutral sulphite and formaldehyde to form formaldehyde bisulphite. The condensation with sulfur is effected, for example, by boiling under a reflux condenser, sulfuretted hydrogen being liberated. The tanning agents obtained, after the reaction, by acidifying the alkaline solution, produce properly tanned leather, with a good body, the yield increasing according to the amount of sulfur employed, whilst the color changes from reddish white to a strong pink.

The tanning agents obtained in accordance with the present invention may also be used in mixture with natural or other artificial tanning agents or other substances. The initial materials which are condensed with sulfur according to the present invention probably have a structure corresponding to the following general formula:—

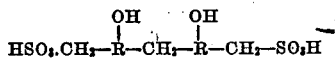

in which R stands for an aromatic nucleus. These substances must be considered as aralkylsulfonic acids. On condensing these products with sulfur in the presence of alkaline agents one or more sulfur bridges are formed, hydrogen sulphid being evolved, and products soluble in water are obtained which also have the character of aralkylsulphonic acids and which have a structure probably corresponding to the general formula:—

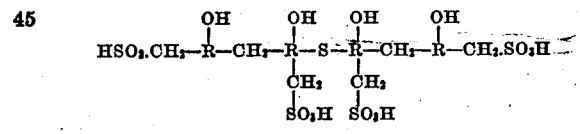

It should be understood that it is not known how many molecules of the initial material are condensed.

The following examples will further illustrate the nature of the said invention which however is not limited thereto. The parts are by weight.

Example 1.

A solution of 504 parts of crystallized sodium sulphite in 400 parts of water is stirred with 188 parts of phenol and 200 parts of 30 per cent formaldehyde, in a hot water bath and under a reflux condenser until a sample remains clear after acidification. The product thus obtained when dissolved in water and slightly acidulated and treated with ferric chlorid solution yields a blue coloration which soon turns greyish-brown in color. 64 parts of finely powdered sulfur are then added, and the mixture is heated to boiling and kept stirred, under the reflux condenser, until the sulfur has passed into solution and the evolution of sulfuretted hydrogen has ceased. The resulting solution, which may be diluted and filtered as required, is acidified and is ready for use in tanning after the sulfurous acid has been expelled by boiling. It may also be extensively concentrated in vacuo, or transformed into a neutral, readily soluble salt, by neutralization.

The procedure is similar when other quantitative proportions are used, as for instance more sulfur for example 1½ times to twice as much, and other quantities of formaldehyde.

Example 2.

A solution of 216 parts of m-cresol in 287 parts of 40 per cent caustic soda solution is stirred and heated in the boiling water bath, under a reflux condenser, with a solution of 156 parts of solid sodium bisulphite in 300 parts of water and 300 parts of 30 per cent formaldehyde, until a sample no longer becomes cloudy on acidification. Thereupon, 128 parts of finely powdered sulfur are introduced, and boiling is continued, while stirring, and under the reflux condenser, until the sulfur has passed into solution and the evolution of sulfuretted hydrogen has ceased. The further treatment of the reaction product is effected as in Example 1. The product thus obtained gives a violet to reddish violet coloration with ferric chloride solution in a slightly acidulated aqueous solution.

*Example 3.*

The condensation product obtained by heating a mixture of 257 parts of p-chlorphenol, 200 parts of 30 per cent formaldehyde and a solution of 504 parts of crystallized sodium sulphite in 400 parts of water while stirring in the boiling water bath and under a reflux condenser, is heated to boiling with 96 parts of finely powdered sulfur, while stirring and under the reflux condenser, until the evolution of sulfuretted hydrogen has ceased, the subsequent treatment being the same as in Example 1. A slightly acidulated aqueous solution of the product thus obtained gives blue colorations with ferric chlorid solution which soon turn greyish-blue.

I claim:

1. The process of producing artificial tanning agents which consists in condensing sulfur, in the presence of an alkaline agent, with a condensation product of a phenol, formaldehyde and a salt of sulfurous acid.

2. The process of producing an artificial tanning agent which consists in heating a mixture of phenol, formaldehyde, and a water solution of crystallized sodium sulphite until a sample remains clear after acidification, adding finely powdered sulfur and heating the mixture until the sulfur has passed into solution.

3. The process of producing an artificial tanning agent which consists in heating the mixture of 188 parts of phenol, 200 parts of 30% formaldehyde and 504 parts of crystallized sodium sulphite in 400 parts of water until a sample remains clear after acidification, adding 64 parts of finely powdered sulfur and heating the mixture until the sulfur has passed into solution.

4. As new articles of manufacture, condensation products probably having a structure corresponding to the general formula:—

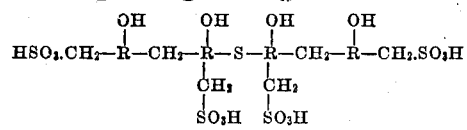

in which R stands for an aromatic nucleus obtainable by the interaction, in the presence of an alkaline agent, of sulphur and a condensation product of a phenol, formaldehyde and a salt of sulfurous acid.

5. As new articles of manufacture, condensation products probably having a structure corresponding to the formula:—

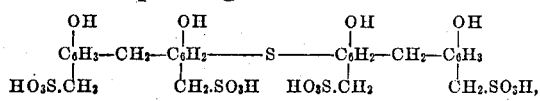

the said products on being dissolved in water and slightly acidulated giving a blue coloration which soon turns to a greyish-brown with ferric chlorid solution and which are obtainable by the interaction, in the presence of an alkaline agent, of sulfur and the condensation product of phenol, formaldehyde and sodium sulphite.

6. A tanning agent probably having a structure corresponding to the formula:—

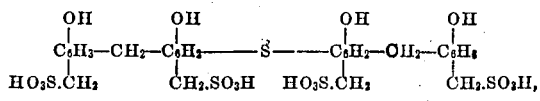

the said product on being dissolved in water and slightly acidulated giving a blue coloration which soon turns into a greyish-brown with ferric chlorid solution and which is obtained by heating 64 parts of finely powdered sulfur with the product obtainable by heating a mixture of 188 parts of phenol, 200 parts of 30% formaldehyde, and 504 parts of crystallized sodium sulphite dissolved in 400 parts of water.

In testimony whereof I have hereunto set my hand.

HERMANN SCHÜTTE.